United States Patent [19]

Pusch et al.

[11] Patent Number: 5,379,841
[45] Date of Patent: Jan. 10, 1995

[54] METHOD FOR REDUCING OR COMPLETELY STOPPING THE INFLUX OF WATER IN BOREHOLES FOR THE EXTRACTION OF OIL AND/OR HYDROCARBON GAS

[75] Inventors: Günter Pusch, Celle; Mohammad Ranjbar, Clausthal-Zellerfeld, both of Germany

[73] Assignee: Hoechst Aktiengesellschaft, Frankfurt, Germany

[21] Appl. No.: 45,930

[22] Filed: Apr. 12, 1993

[30] Foreign Application Priority Data

Apr. 10, 1992 [DE] Germany .................. 4212210

[51] Int. Cl.$^6$ ................ E21B 33/138; E21B 43/12
[52] U.S. Cl. .................. 166/295; 166/305.1
[58] Field of Search .............. 166/294, 295, 305.1

[56] References Cited

U.S. PATENT DOCUMENTS

| | | | |
|---|---|---|---|
| 3,820,603 | 6/1974 | Knight et al. | 166/295 |
| 3,826,311 | 7/1974 | Szabo et al. | 166/294 X |
| 4,309,523 | 1/1982 | Engelhardt et al. | |
| 4,357,245 | 11/1982 | Engelhardt et al. | |
| 4,451,631 | 5/1984 | Engelhardt et al. | 166/295 X |
| 4,455,240 | 6/1984 | Costello . | |
| 4,460,477 | 7/1984 | Costello et al. | 210/701 |
| 4,484,631 | 11/1984 | Sherwood et al. | 166/294 X |
| 4,510,059 | 4/1985 | Amjad et al. | 210/701 |
| 4,521,579 | 6/1985 | Engelhardt et al. | |
| 4,533,708 | 8/1985 | Costello . | |
| 4,842,071 | 6/1989 | Zaitoun et al. | 166/295 |
| 4,951,921 | 8/1990 | Stahl et al. | 166/295 X |

FOREIGN PATENT DOCUMENTS

| | | |
|---|---|---|
| 0023712 | 2/1981 | European Pat. Off. . |
| 0044508 | 1/1982 | European Pat. Off. . |
| 0156031 | 10/1985 | European Pat. Off. . |
| 2224636 | 10/1974 | France . |

*Primary Examiner*—George A. Suchfield
*Attorney, Agent, or Firm*—Connolly and Hutz

[57] ABSTRACT

The present invention relates to a method for reducing or completely stopping the water inflows from a deposit in at least a portion of a borehole for the extraction of oil and/or hydrocarbon gas, which borehole traverses a deposit, an aqueous solution of a copolymer being introduced, starting from the borehole, into that portion of the deposit in which the water inflows are to be reduced or stopped, and the borehole subsequently being put into service for the extraction of oil and/or hydrocarbon gas, the fluids present in the deposit coming into contact with said portion of the deposit containing the adsorbed copolymer, and the oil and/or hydrocarbon gas flowing through said portion of the deposit and reaching the borehole, while the passage of the deposit is reduced, wherein the aqueous solution contains a copolymer based on acrylamidoalkylenesulfonate, vinylacetamide and optionally further monomers.

23 Claims, 2 Drawing Sheets

METHOD FOR REDUCING OR COMPLETELY STOPPING THE INFLUX OF WATER IN BOREHOLES FOR THE EXTRACTION OF OIL AND/OR HYDROCARBON GAS

BACKGROUND OF THE INVENTION

1. Field of Invention

The present invention relates to a method for reducing or completely stopping the water inflows in the case of an underground formation containing hydrocarbons into a borehole which has been drilled there. Using this method, it is possible to shut out water without thereby reducing the passage of oil and/or of hydrocarbon gas into the borehole.

2. Description of the Prior Art

Water often exists as a saline solution in the same formation as oil or gas. The extraction of oil or of hydrocarbon gas is thus accompanied by the extraction of water in such an amount as to give rise to considerable problems; directly or indirectly it causes the precipitation of salts in the vicinity of the borehole or in the borehole itself, it considerably increases the corrosion of all metal parts underground or above ground, it increases, without any benefit, the quantities of the liquids pumped, transferred and stored, and it produces emulsions with the oil which are difficult to break above ground and which, below ground, form blockages in the cavities of the formation.

According to the prior art, numerous methods have been proposed and practiced whose purpose is to reduce the water inflows into the boreholes for the extraction of oil or hydrocarbon gas. The methods frequently consist in the introduction of an impregnable barrier in the formation between the water and the borehole or between the water and the oil or hydrocarbon gas. The agents commonly introduced block almost as much oil or hydrocarbon gas as water. The components of this barrier may be: cement, resins, suspensions of solid particles, paraffins or water-soluble polymers which are crosslinked in the deposit by means of the introduction of so-called cross-linkers.

At present polymers are used, the polymers introduced as a solution into the porous environment, adsorbed on the surface of the solid and project into the space of the pores so as to be suitable for reducing into the water inflows by friction. In contrast, the non-aqueous fluids such as oil or especially hydrocarbon gas pass the adsorbed macromolecules which now take up a negligible volume on the wall and thus leave the passage completely free.

U.S. Pat. No. 4,095,651 discloses the use of hydrolyzed polyacrylamides. It has been found, however, that this polymer type is effective mainly with respect to water having a low salt content and is degraded by water having a higher salt content. At elevated temperatures said polymers, in the presence of polyvalent ions, tend to form precipitates which may block the pores of the rock formations.

U.S. Pat. No. 4,718,491 discloses the use of polysaccharides. While these compounds, which are difficult to inject into the pore space, have the effect of retarding or reducing the influx of water, they permit only incomplete working of the existing deposits and/or lose their effect at higher temperatures.

U.S. Pat. No. 4,842,071 discloses the use of non-hydrolyzed acrylamide polymers or copolymers which are hydrolyzed by the subsequent introduction of an aqueous basic solution. This method has drawbacks in terms of additional effort required due to the introduction of a further solution and due to the problem of reaching the injected polymer solution with the basic solution which is applied subsequently, and with regard to increased corrosion susceptibility of the equipment used. Furthermore, the polymer solution is effective only upon reaction having taken place with the aqueous basic solution, the efficiency being determined by the extent of the reaction.

SUMMARY OF THE INVENTION

The object of the invention is to provide a method for reducing the influx of water into production boreholes without reducing the extraction of oil or hydrocarbon gas.

Surprisingly it has been found that water soluble copolymers based on acrylamidoalkylenesulfonic acid, vinylacetamide and optionally further monomers are notable for high adsorption on the rocks of the deposit, have an elastic extension-compression behavior, are particularly stable with respect to salts in deposit waters and can be used over a wide temperature range, especially at elevated temperatures.

The method according to the invention must not be confused with the method for the tertiary extraction of oil, according to which a polymer solution which in general has a weak concentration (a few 100 ppm) is introduced via one or more injection boreholes, specifically under a sufficient pressure for the solution to penetrate into the formation and to replace part of the oil of said formation which is then extracted by means of another series of production boreholes. The amounts introduced are of the order of magnitude of the volume of the formation. It is well known that polymer-containing water is much more effective for this method of extraction, because it is more viscous than the deposit water.

The method according to the invention must furthermore not be confused with the method which consists in adding a polymer to drilling fluids. The purpose of these fluids is to lubricate the drilling tool, to enable the discharge of the rock fragments, to exert a backpressure which is noticeably equal to the formation pressure underground, and to produce a suspension on the walls of the borehole. They circulate in a closed circulation between the bottom and the surface where they are filtered and their composition is readjusted. The amounts used are small, specifically of the order of magnitude of the borehole volume.

The method according to the invention, whose objective is to reduce the water inflows into a borehole in the course of production, consists in introducing into the deposit —starting from said borehole —an amount of a polymer solution.

DESCRIPTION OF THE PREFERRED EMBODIMENTS

Figure 2:
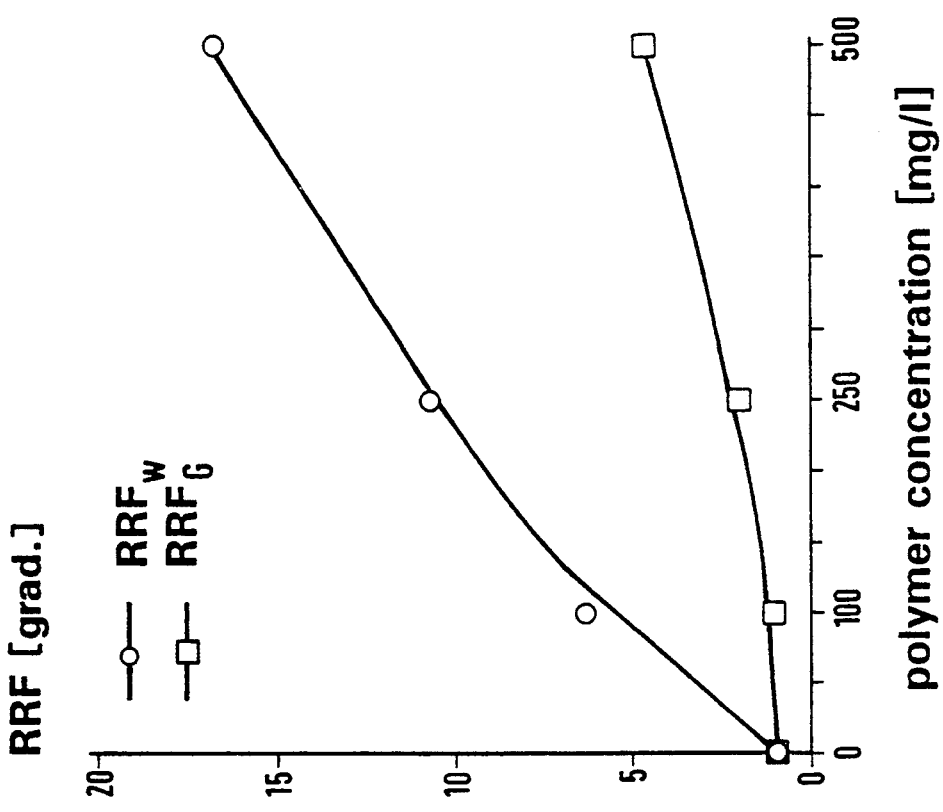
FIG. 2 shows the adsorption effect of HOSTAMER ® and the residual resistance factor resulting therefrom for water and nitrogen on Oberkirchen sandstone.

The invention relates to a method for reducing or completely stopping the water influx from a deposit in at least a portion of a borehole for the extraction of oil and/or hydrocarbon gas, which borehole traverses a deposit, an aqueous solution of a copolymer being introduced, starting from said borehole, into that portion of the deposit in which the water inflows are to be reduced or stopped, and the borehole subsequently being put into service for the extraction of oil and/or hydrocarbon gas, the fluids present in the deposit coming into contact with said portion of the deposit containing the adsorbed polymer, and the oil and/or the hydrocarbon gas flowing through said portion of the deposit and reaching the borehole, while the passage for water of the deposit is reduced, wherein the aqueous solution contains a copolymer which comprises 5–90% by weight of structural units of the formula

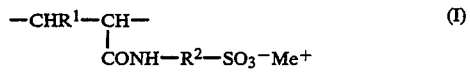

in which
R$^1$ is hydrogen or methyl,
R$^2$ is C$_2$–C$_{10}$-alkylene, preferably C$_2$–C$_6$-alkylene, especially preferably C$_4$-alkylene and
Me is ammonium or an alkali metal ion,
5–95% by weight of structural units of the formula

in which
R$^3$ and R$^4$, independently of one another, are hydrogen, methyl or ethyl, or R$^3$ and R$^4$ together are a propylene group which, with the inclusion of a radical

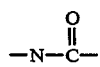

forms a pyrrolidone radical, 0–90% by weight of structural units of the formula

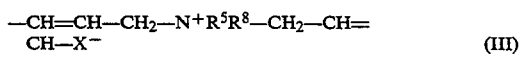

in which
X is a halogen, preferably chloride
R$^5$ and R$^6$, independently of one another, are C$_1$–C$_6$-alkyl, preferably C$_1$–C$_3$-alkyl, especially methyl or ethyl and 0–90% by weight of structural units of the formula

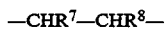

in which
R$^7$ is hydrogen or methyl and
R$^8$ is CONH$_2$, CON(CH$_3$)$_2$, cyano, SO$_3$H, SO$_3$Me, C$_6$H$_4$SO$_3$H, C$_6$H$_4$SO$_3$Me, CH$_2$SO$_3$H, CH$_2$SO$_3$Me, COOH, COOMe or an ester group COOR, R being C$_1$–C$_{15}$-alkyl, preferably C$_1$–C$_8$-alkyl.

Preferred water-soluble copolymers comprise 40–90% by weight of structural units of the formula (I),
10–60% by weight of structural units of the formula (II) and
0–40% by weight of structural units of the formula (III).

Suitable copolymers contain the monomers 2-acrylamido-2-methylpropanesulfonic acid (AMPS), diallyldimethylammonium chloride (DADMAC), N-vinyl-N-methylacetamide (VIMA), N-vinylpyrrolidone (VIPY), acrylamide (AM), vinylacetamide (VA) and vinylformamide (VF).

Examples are copolymers comprising 40–70% by weight of 2-acrylamido-2-methylpropanesulfonic acid, 1 to 30%, preferably 10–30% by weight of vinylacetamide and 0–60% by weight of acrylamide or 5–60% by weight of 2-acrylamido-2-methylpropanesulfonic acid or vinylsulfonic acid, 2–20% by weight of vinylacetamide and 45–90% by weight of acrylamide.

The molecular weights of the copolymers used are from 50,000 to 20·10$^6$. The molecular weights for copolymers having a low molecular weight are in the range between 50,000 and 3·10$^6$, preferably 200,000–1·10$^6$. Copolymers having a high molecular weight have molecular weights in the range from more than 3·10$^6$ to 20·10$^6$.

It was found that in the case of rocks having a low permeability the use of copolymers having a low molecular weight is advantageous. Such copolymers are easily injected and, compared with copolymers having a high molecular weight and equal viscosity, penetrate more deeply into rocks having a small pore diameter, without excessively high pressures being required.

The water-soluble copolymers used and methods for the preparation thereof are described in EP-A-044,508, EP-A-023,712 and the as yet unpublished European Patent Application No. 91117945.5.

The concentration of the aqueous polymer solution can be chosen within wide ranges and is preferably between 100 and 20,000 ppm in parts by weight. The amount of the copolymer introduced into the production zone around the borehole depends on the local conditions. In most cases it is from 50 to 5,000 kg and preferably from 200 to 1,000 kg per vertical meter of the zone treated. As a further component, the polymer solution may contain one or more salts of alkali metals or alkaline earth metals, especially NaCl, KCl, MgCl$_2$, MgSO$_4$, CaCl$_2$, Na$_2$SO$_4$, K$_2$SO$_4$ and/or NaNO$_3$, and generally of chlorides, sulfates or nitrates of metals such as, for example, sodium, potassium, calcium or magnesium. Those solutions are preferred which, at least for the greater part, contain sodium chloride. The salts of the alkaline earth metals are less desirable, especially in larger amounts, because they may produce unwanted precipitates, for example if the environment contains carbonates or has a pH which is equal to or greater than 9.

Similarly it is advisable to avoid the presence of substantial amounts of metal ions other than those of alkali metals or alkaline earth metals, as such ions may permit crosslinking with certain polymers which may give rise to complete sealing of the zone treated.

The salt concentration of the salt-containing polymer solution can be selected within wide ranges. It depends on the nature and the concentration of salt in the water of the deposit as well as on the nature of the salt present in the polymer solution, so that it is not possible to give a general range of the usable values. The optimum salt concentration can be determined by a simple prior experiment. A generally valid rule states that the salts of the alkali metals must be used in a stronger concentration than the salts of the alkaline earth metals. Relatively high concentrations in general are especially advantageous, for example in the case of sodium chloride at least 20 g/l and preferably at least 75 g of salt/l of water, especially from 100 to 200 g/l. Calcium chloride is generally used at a concentration of at least 5 g/l, preferably from 10 to 20 g/l. There is no upper limit except that which would prevent the polymer from being kept in solution. In general, the viscosity of the polymer solution decreases for a given salt with increasing concentration of said salt. If the water in the deposit contains predominantly sodium chloride it is therefore advantageous, according to the present method, to use a polymer solution whose salt content in terms of sodium chloride is higher than the salt content of the water of the deposit.

It has further been found that an elevated salt content in general increases the absorption of the dissolved polymer.

This improvement of the absorption is achieved in particular by the addition of alkaline earth metal salts.

The method can be made more effective if the formation of agglomerates is facilitated, for example by dissolving the copolymer in the presence of formol and oxygen or by exerting mechanical shearing in the interior of the solution with the aid of velocity during introduction.

The manner of introduction of the polymer solution is not per se novel. Reference can be made, for example, to the explanations in U.S. Pat. No. 3,308,885. In general terms, a pressure is exerted on the polymer solution which is greater than the pressure exerted by the fluids such as deposit water, oil and hydrocarbon gas in the deposit which is chosen for the treatment procedure (deposit pressure). This enables the solution to penetrate into the deposit up to remarkable distances from the borehole, preferably of at least 20 m under the conditions described above.

The water-soluble copolymers are preferably used for reducing or completely stopping the flow of water in the case of boreholes in sandstone, carbonate rock or silicate rock.

By means of a modification of the copolymers used, the absorbability of the polymer can be adapted to the rock type present. The absorption on carbonate-containing rocks can be improved by means of a so-called anionic modification of the polymers used. Anionic modification is usually achieved by an increased proportion of structural units of the formula II and especially of the formula III in polymers.

The absorption on silicate-containing rocks can be improved by means of a so-called cationic modification of the polymers used. Cationic modification is usually achieved by an increased proportion of structural units of the formula IV in polymers.

An increased proportion is in the range above 40% by weight, preferably 50–80% by weight, of structural units of the formulae II, III and IV.

The use of the water-soluble copolymers is also found to be advantageous with regard to the copolymers being highly effective owing to elastic extension-compression behavior precisely in the adsorbed state, and showing excellent stability with respect to salts in deposit water and over a wide temperature range, especially at high temperatures.

The following tests document the effectiveness of the water-soluble copolymers on the flow resistance of salt water and gas in a porous medium. The gas used is nitrogen which serves as a substitute for natural gas. The porous media used are Vosges sandstone having a permeability $K=53$ mD ($53 \cdot 10^{-15}$ m$^2$) and Oberkirchen sandstone having a permeability $K=5.4$ mD ($5.4 \cdot 10^{-15}$ m$^2$). The "deposit water" used, which at the same time serves as a solvent for the copolymers, is an aqueous solution having a salt content of 97.5 g of NaCl and 2.5 g of CaCl$_2$ per 100 g of water. The copolymers used are "HOSTAMER" ® a viscosifier for acidic water-based fluids in the oil field. It is a synthetic, anionic, water-soluble, cross-linkable copolymer based on acrylamide and further vinylic copolymers. and "HOSTADRILL ®," synthetic polymer to control filtration and rheology of water-based drilling, completion and workover fluids at temperatures in excess of 200° C. (400° F.) (manufacturer: Hoechst AG, DE).

The tests are divided into the following part steps:
measurement of the permeability for nitrogen of the anhydrous rock core $k_1$
saturation of the porous medium with "deposit water" (=pore water); determination of the pressure gradient $\Delta p_1$ for the flow of water having a constant rate $q_1$ l
saturation of the porous medium with an aqueous copolymer solution
displacement of the excess copolymer solution by "deposit water" until an equilibrium has been established between this pore water and the adsorbing copolymer. Measurement of the pressure gradient $\Delta p_2$ for water at flow rate $q_1$ in the presence of the l adsorbed polymer
displacement of the water with nitrogen and measurement of the permeability for nitrogen in the presence of the adsorbed polymer $k_2$ Following these preliminary steps whose performance is familiar to those skilled in the art and therefore needs no further explanation, the residual flow resistance of the "deposit water" and of the nitrogen is determined.

$$RRF_W = \frac{\Delta p_2}{\Delta p_1}$$

$$RRF_G = \frac{k_2}{k_1}$$

The symbols have the following meaning:
k: Permeability of the rock depending on the pore size [Darcy] $\mu m^2 = 1$ Darcy
RRF: Residual resistance factor
$RRF_w$: Residual resistance factor of the deposit water
$RRF_G$: Residual resistance factor of the gas (nitrogen)
l: Length of the rock core [m]
p: Pressure drop over the core [Pa]
q: Flow rate of the water [m$^3$s$^{-1}$]

Figure 1:
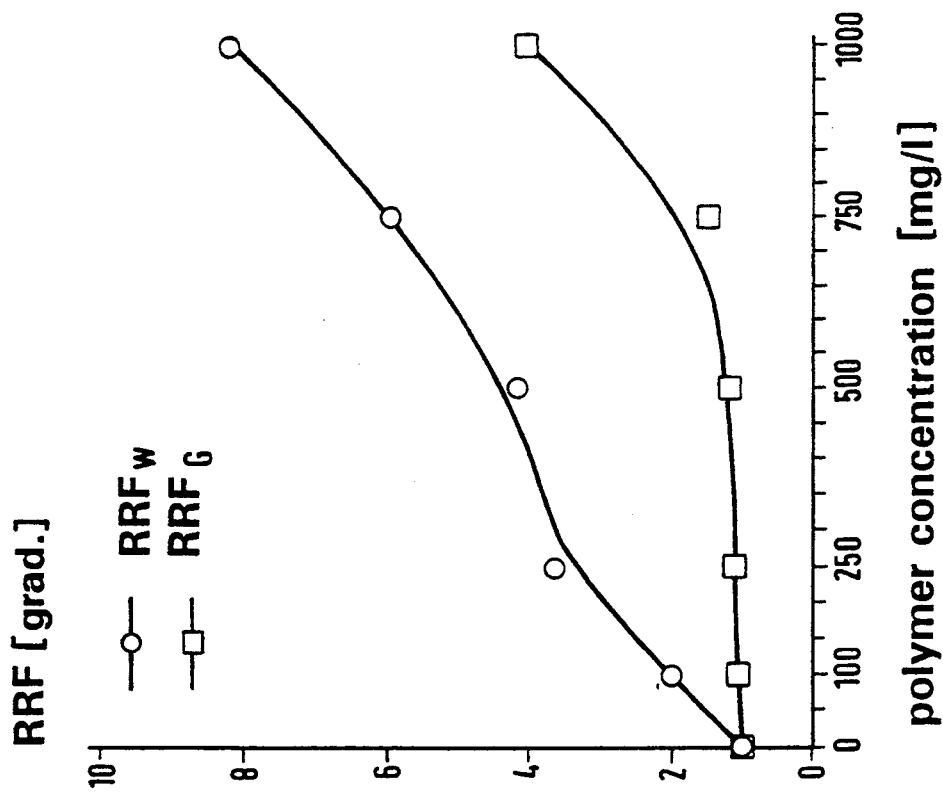
FIG. 1 shows the adsorption effect of HOSTAMER ® and the residual resistance factor resulting therefrom for water and nitrogen on Vosges sandstone.

FIGS. 1 and 2 show the adsorption effect of "HOSTAMER ®" and the residual resistance factor resulting therefrom for water and nitrogen on Vosges sandstone (FIG. 1) and Oberkirchen sandstone (FIG. 2). While the RRF value for gas remains approximately constant up to a polymer concentration of 750 mg/l, said factor for water increases to 6 times the value (FIG. 1). FIG. 2 shows the results in Oberkirchen sandstone.

Compared to the Vosges sandstone, the critical polymer concentration is reduced from 750 mg/l to 250 mg/l, which can be ascribed to the low permeability of the sandstone.

Figure 4:
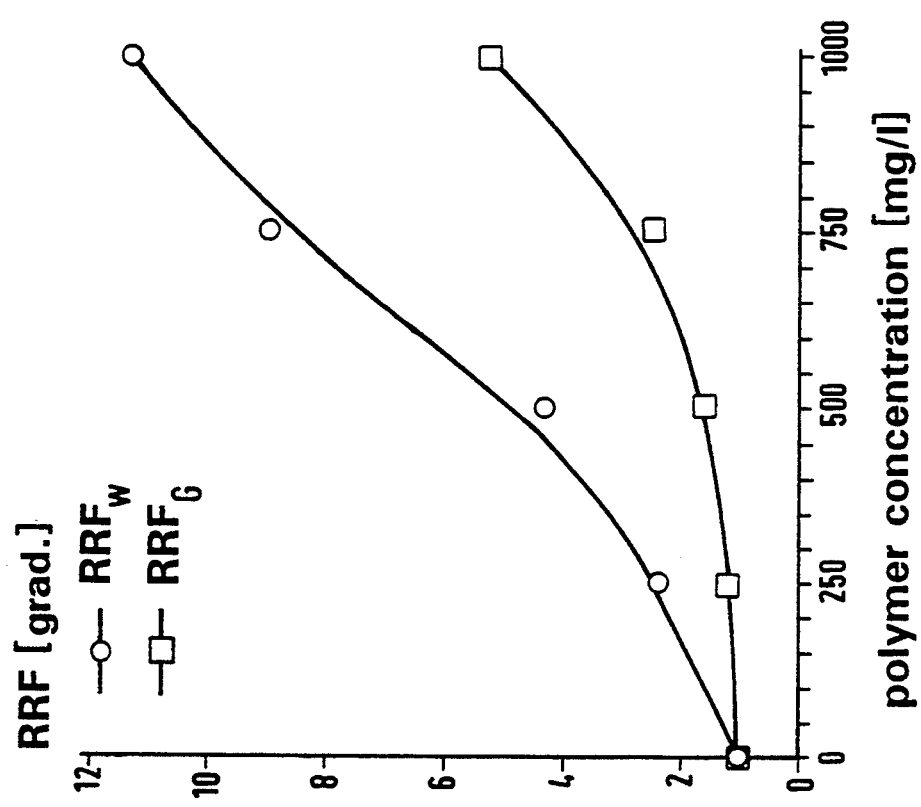
FIG. 4 shows the results determined for HOSTADRILL ® and Oberkirchen sanstone.
Figure 3:
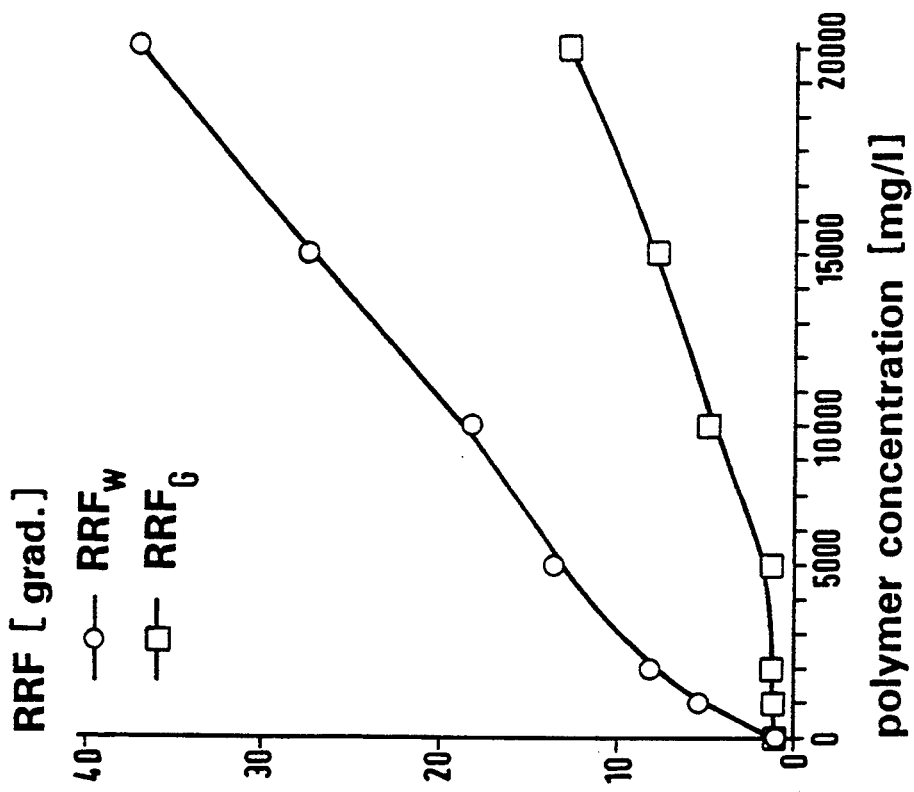
FIG. 3 shows the results determined for HOSTADRILL ® and Vosges sandstone.

FIGS. 3 and 4 show the results determined for "HOSTADRILL®" in Vosges and Oberkirchen sandstone. It was found that a higher polymer concentration is required to achieve the same adsorption effect.

The method according to the invention was employed with great success in field trials at the production borehole of a natural-gas field in northern Germany. A copolymer solution according to our invention has been injected into a gasborehole having a temperature of 130° C., a salt content of 300 g formation salts/l water and an average permeability of 10 mDarcy. The injected copolymer solution was consisting of 200 m³ of an aqueous solution consisting of 90.5% by weight of a copolymer consisting of 37.1% by weight 2-acrylamido-2-methylpropanesulfonic acid-ammonium salt, 58.3% by weight acrylamide, 3.5% by weight N-vinylformamide and 1.1% by weight vinylphosphonic acid-ammonium salt, having a salt content of 180 g NaCl/l water. The copolymer solution was injected with a pressure noticeably equal to the frak pressure of the formation and with a constant injection rate. The gas production could be increased from 0 m³/day up to 100,000 m³/day, the amount of water was 1 m³/day.

We claim:

1. A method for reducing or completely stopping the water inflows from a deposit in at least a portion of a borehole for the extraction of oil and/or hydrocarbon gas, which borehole traverses a deposit, an aqueous solution of a copolymer being introduced, starting from the borehole, into that portion of the deposit in which the water inflows are to be reduced or stopped, and the borehole subsequently being put into service for the extraction of oil and/or hydrocarbon gas, the fluids present in the deposit coming into contact with said portion of the deposit containing an adsorbed copolymer, and the oil and/or hydrocarbon gas flowing through said portion of the deposit and reaching the borehole, while the passage of the deposit is reduced, wherein the aqueous solution contains a copolymer which comprises 5-90% by weight of structural units of the formula

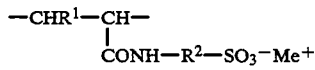

in which
$R^1$ is hydrogen or methyl,
$R^2$ is $C_2$-$C_{10}$-alkylene, and
Me is ammonium or an alkali metal ion,
5-95% by weight of structural units of the formula

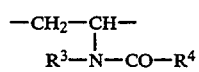

in which
$R^3$ and $R^4$, independently of one another, are hydrogen, methyl or ethyl or $R^3$ and $R^4$ together are a propylene group which, with the inclusion of a radical

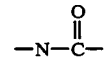

forms a pyrrolidone radical,
0–90% by weight of structural units of the formula

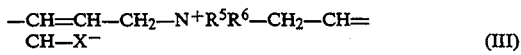 (III)

in which
X is a halogen,
$R^5$ and $R^6$, independently of one another, are $C_1$-$C_6$-alkyl, and
0–90% by weight of structural units of the formula

 (IV)

in which
$R^7$ is hydrogen or methyl and
$R^8$ is $CONH_2$, $CON(CH_3)_2$, cyano, $SO_3H$, $SO_3Me$, $C_6H_4SO_3H$, $C_6H_4SO_3Me$, $CH_2SO_3$, H, $CH_2SO_3Me$, COOH, COOMe or an ester group COOR, R being $C_1$-$C_{15}$-alkyl,
and optionally further unsaturated monomers.

2. The method as claimed in claim 1, wherein cationically modified copolymers having an increased proportion of structural units of the formulae (II) or (III) or a mixture of (II) and (III) are used which are notable for enhanced adsorption on carbonate-containing rocks.

3. The method as claimed in claim 1, wherein anionically modified copolymers having an increased proportion of structural units of the formula (IV), in which $R^8$ is $SO_3H$, $SO_3Me$, $C_6H_4SO_3H$, $C_6H_4SO_3Me$, $CH_2SO_3H$ and $CH_2SO_3Me$ are used which are notable for enhanced adsorption on sulfate-containing rocks.

4. The method as claimed in claim 1, wherein the copolymers used comprise 40–90% by weight of structural units of the formula (I), 10–60% by weight of structural units of the formula (II) and 0–40% by weight of structural units of the formula (III).

5. The method as claimed in claim 1, wherein the copolymers used comprise 40–70% by weight of 2-acrylamido-2-methylpropanesulfonic acid, 1–30% by weight of vinylacetamide and 0–60% by weight of acrylamide.

6. The method as claimed in claim 5, wherein the copolymers comprise 10–30% by weight of vinylacetamide.

7. The method as claimed in claim 5, wherein the copolymers have a molecular weight from 200,000 to $1 \cdot 10^6$.

8. The method as claimed in claim 1, wherein the copolymers used comprise 5–60% by weight of 2-acrylamido-2-methylpropanesulfonic acid or vinylsulfonic acid, 2–20% by weight of vinylacetamide and 45–90% by weight of acrylamide.

9. The method as claimed in claim 8, wherein the copolymers have a molecular weight from 50,000 to $3 \cdot 10^6$.

10. The method as claimed in claim 1, wherein copolymers having a molecular weight from 50,000 to $20 \cdot 10^6$ are used.

11. The method as claimed in claim 1, wherein the aqueous solution of the copolymer has a concentration from 100 to 20,000 ppm in parts by weight.

12. The method as claimed in claim 1, wherein the aqueous solution of the copolymer has a higher salt content than the deposit water.

13. The method as claimed in claim 1, wherein $R^2$ is $C_2$–$C_6$-alkylene and X is chloride, and $R^5$ and $R^6$, independent of one another, are $C_1$–$C_3$-alkyl and R is $C_1$–$C_8$-alkyl.

14. The method as claimed in claim 13, wherein $R^2$ is $C_4$-alkylene and $R^5$ and $R^6$, independently of one another, are either methyl or ethyl.

15. The method as claimed in claim 1, wherein the copolymers have a molecular weight from $3 \cdot 10^6$ to $20 \cdot 10^6$.

16. The method as claimed in claim in claim 1, wherein the amount of the copolymer introduced into a production zone around the borehole is from 50 to 5,000 kilograms.

17. The method as claimed in claim 1, wherein the amount of the copolymer introduced into a production zone around the borehole is from 200 to 1,000 kilograms.

18. The method as claimed in claim 1, wherein said polymer has a said concentration of at least 20 grams/liter of salt if sodium chloride is selected as the salt, or at least 5 grams/liter of said if calcium chloride is selected as the salt.

19. The method as claimed in claim 18, wherein the concentration of sodium chloride is from 100 to 200 grams/liter of salt if sodium chloride is selected as the salt or the concentration of calcium chloride is from 10 to about 20 grams/liter of salt if calcium chloride is selected as the salt.

20. The method as claimed in claim 1, wherein the polymer further comprises vinylphosphonic acid-ammonium salt.

21. The method as claimed in claim 20, wherein vinylphosphonic acid-ammonium salt is present in an amount up to 1.1% by weight.

22. A method for reducing or completely stopping the water inflows from a deposit in at least a portion of a borehole which passes through a deposit, for the extraction of oil and/or hydrocarbon gas comprising applying aqueous solutions of a copolymer containing the structural units as claimed in claim 1 to said borehole.

23. The method as claimed in claim 22, wherein the step of applying is performed by injecting.

* * * * *